United States Patent [19]

Dixon

[11] Patent Number: 4,526,192

[45] Date of Patent: Jul. 2, 1985

[54] DISCHARGE VALVE

[75] Inventor: Robert W. Dixon, Concord, Calif.

[73] Assignee: Chas. M. Bailey Co., Inc., Emeryville, Calif.

[21] Appl. No.: 520,650

[22] Filed: Aug. 5, 1983

[51] Int. Cl.³ .......................... F16K 3/26; F16K 3/32
[52] U.S. Cl. ................................ 137/244; 137/625.3; 137/625.38; 210/430
[58] Field of Search .................. 251/344; 137/625.37, 137/625.38, 625.39, 625.3, 244; 210/429, 430

[56] References Cited

U.S. PATENT DOCUMENTS

| | | | |
|---|---|---|---|
| 1,062,614 | 5/1913 | Sneddon | 210/430 X |
| 1,938,943 | 12/1933 | Terry | 137/494 |
| 3,094,306 | 6/1963 | Conrad | 251/344 X |
| 3,430,643 | 3/1969 | Heiland | 137/244 |
| 3,514,071 | 5/1970 | Moffatt | 137/625.38 X |
| 3,605,787 | 9/1971 | Krogfoss et al. | 137/625.38 X |
| 4,080,982 | 3/1978 | Maezawa | 137/625.3 X |

Primary Examiner—Arnold Rosenthal
Attorney, Agent, or Firm—Lothrop & West

[57] ABSTRACT

A discharge valve, especially for liquids, has a tubular body with an inlet and a circumferential outlet. A sleeve is slidable on the body around the outlet and has a large number of holes affording varying flow through the outlet, depending upon the sleeve location. In an extreme or shut-off position of the sleeve, a bearing ring on the body is abutted by a packing ring on the sleeve carrying an O-ring to seal against the bearing ring.

4 Claims, 2 Drawing Figures

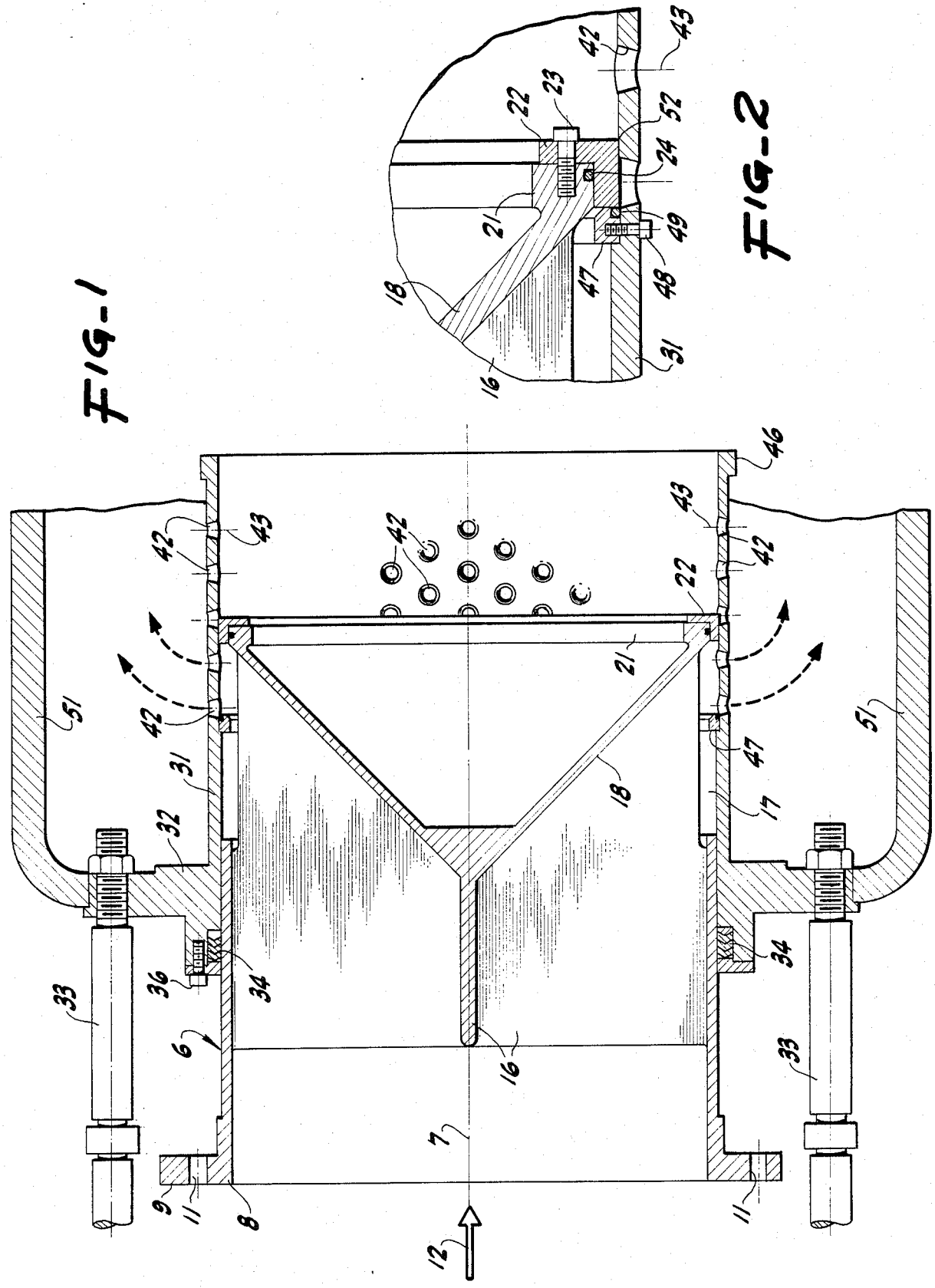

DISCHARGE VALVE

BRIEF SUMMARY OF THE INVENTION

A discharge valve which can be used submersed in a liquid being controlled includes a body symmetrical about a main axis and having a concentric, circular seat. There is an outlet opening between the seat and the remainder of the body. The outlet is more or less covered by a coaxial polyjet sleeve, slidable over the seat and on the body. The sleeve is perforated with a plurality of flow holes, each having an axis substantially normal to the main axis of the body and spaced apart from others of the flow holes. The sleeve moves axially, relative to the body to establish communication between any selected number of the holes and the outlet opening. There is a packing ring on the sleeve. A bearing ring is engaged with the circular seat and is in engagement with the interior of the sleeve and is adapted to abut the packing ring.

PRIOR ART

Particular reference is made to U.S. Pat. No. 3,605,787, issued to Krogfoss and Dixon on Sept. 20, 1971 for a polyjet valve. The present disclosure includes a number of improvements over the basic valve disclosed in that patent.

BRIEF DESCRIPTION OF THE SEVERAL VIEWS OF THE DRAWING

FIG. 1 is a cross-section on a vertical, transverse plane through a partly open valve of the invention, being comparable to FIG. 1 in the mentioned patent.

FIG. 2 is a detail showing parts of the valve of FIG. 1 in closed position.

DETAILED DESCRIPTION

Polyjet valves have gone into widespread use, particularly for the control of liquid flow. A main use is to regulate water in hydraulic and hydroelectric projects wherein the discharge of a large quantity of water must be carefully regulated without damage to the environment or to the valve itself. Some special operations have developed collateral problems which it is an object of the present device to overcome. One of the difficulties is that a polyjet valve includes a number of carefully shaped, relatively small orifices through many or all of which the discharging liquid travels. If the liquid is relatively clean, there is no interference with the valve operation. In instances wherein the liquid contains debris of various sorts, it is possible for the debris to catch in or lodge in the various orifices or holes and to tend to block the free axial motion of the valve parts.

In the form of the invention embodied herein, there is provided a valve body 6 of generally circular, cylindrical form symmetrical about a main axis 7 and having an end portion 8 for use in attaching the valve body to a connecting conduit such as a water pipe, there being provided a flange 9 and openings 11 therein for appropriate fastenings. The flow is from the attached line into the main body 6 in the direction indicated by the arrow 12.

The body 6 extends along the axis 7 and is spanned by a plurality of webs or ribs 16 usually four in number, arranged radially about the axis 7 and in part extending to the outer wall 6 of the body, but in some portions stopping short thereof in order to leave an outlet opening 17 peripherally of the body. The webs 16 conveniently merge with a diverting cone 18 coaxially disposed and extending along the axis to terminate in an end seat 21 marking a boundary of the opening 17. The seat 21 is generally circular and is enlarged around its periphery to receive a bearing ring 22 of L-shaped cross-section overlapping two faces of the seat 21 and secured in position by a number of removable fastenings 23. To preclude leakage between the seat and the ring, an O-ring 24 is conveniently provided and is caged between the flange of the seat 21 and the flange of the ring 22. By removing the fastenings 23, the bearing ring can readily be withdrawn axially.

Designed to operate with an axial motion relative to the main body 6 is a polyjet sleeve 31 also of generally circular, cylindrical construction coaxial with the body about the main axis 7. The polyjet sleeve has an outstanding peripheral flange 32 engaged by driving rods 33 detachably secured to the flange and extending to an operating means (not shown), but comparable to the operating means 48 in the indicated patent. The effect of the operating means is to transmit forces through the rods 33 and to move the flange 32 and so to move the polyjet sleeve 31. There is appropriate packing 34 interposed between the body and the sleeve, the packing being of a standard construction, positioned and removed by the use of fastening screws 36.

A portion of the polyjet sleeve is perforated by a large number of special flow holes 42 having their individual axes 43 spaced apart axially and circumferentially as set forth in the indicated patent. The flow holes are preferably tapered with the narrower diameter at the outside of the sleeve and the wider diameter at the inside of the sleeve, so that liquid flowing through the holes from the inside of the sleeve toward the outside tends to be accelerated and to form jets. The sleeve 31 continues past the polyjet flow holes and terminates in an end flange 46. In addition, there is an interior packing ring 47 seated with the polyjet sleeve and disposed in the vicinity of the outlet 17, the packing being fastened in place by radial bolts 48 and including a packing ring or O-ring 49 exposed on its downstream face.

In the operation of the structure and starting from the closed position of the valve as shown in FIG. 2, flow of liquid from the valve is precluded because of the tight seal effectuated by the O-ring 49 between the ring 47 and the adjacent leg of the bearing ring 22.

When the actuating mechanism 33 is operated to the right in FIG. 1, the sleeve is correspondingly translated to the right and positions increasing numbers of the flow holes 42 in communication with the outlet 17. There is released an increasing number of energy dissipating jets flowing to the outside of the sleeve. If desired, these jets can simply dissipate into the surrounding medium, either the atmosphere or water, but in some instances discharge into the interior of a shroud 51, shown broken away but extending from the flange 32 and customarily extending as far as desired to intercept the issuing jets.

In any proper case, there is substantial liquid discharge through the flow openings, but in the event there should be blockage of some or more of the holes by debris in the fluid, then in the present case it is only necessary to retract the sleeve toward its closed position. In this event debris projecting inwardly toward the axis and through any one or more of the flow holes is carried with the sleeve to the left in FIG. 1. The debris encounters an abrupt or sharp peripheral corner or rim 52 on the bearing ring 22. The abrupt corner of the bearing ring acts in conjunction with the edge of the flow holes (even though such edge may be slightly rounded) as a shear and tends to cut or macerate any projecting debris. In this way the debris is either dislodged or cut sufficiently so that it can flow out with the ensuing discharging jet and clear the openings.

It has been found in practice that when there is a clogging of one or more of the various polyjet openings, it is only necessary to translate the sleeve with respect to the body in a part of a cycle or a full cycle or through several cycles in order to relieve the openings of their obstructions.

I claim:

1. A submersible discharge valve comprising a body symmetrical about a main axis and having an inlet on said main axis, a coaxial circular seat, means for mounting said seat on the end of said body, means defining a radial outlet opening in said body between said inlet and said seat, a coaxial polyjet sleeve mounted to slide over said seat and on said body, said sleeve being perforated with a plurality of radial flow holes, each of said flow holes having a radial axis and being spaced axially from others of said flow holes, means for moving said sleeve axially relative to said body to establish communication between a selected number of said flow holes and said opening, packing means on said sleeve in sliding engagement with said body, and a peripheral bearing ring removably mounted on said circular seat and in sliding engagement with the interior of said sleeve and across said flow holes.

2. A valve as in claim 1 in which said bearing ring has an abrupt edge adapted to act with the margin of said holes as a shear for matter projecting through said holes.

3. A valve as in claim 1 including a stop ring on the interior periphery of said sleeve and having a transverse face adapted to abut said bearing ring.

4. A valve as in claim 3 including a peripheral seal on said transverse face of said stop ring adapted to abut said bearing ring.

* * * * *